(12) United States Patent
Larisch

(10) Patent No.: US 8,185,586 B2
(45) Date of Patent: May 22, 2012

(54) METHOD FOR OUTPUT HANDLING OF MESSAGES STORED IN MAILBOXES OF A MESSAGE STORAGE SYSTEM

(75) Inventor: Erhard Larisch, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 826 days.

(21) Appl. No.: 11/661,798

(22) PCT Filed: Aug. 18, 2005

(86) PCT No.: PCT/EP2005/054072
§ 371 (c)(1),
(2), (4) Date: Mar. 1, 2007

(87) PCT Pub. No.: WO2006/032589
PCT Pub. Date: Mar. 30, 2006

(65) Prior Publication Data
US 2008/0021965 A1    Jan. 24, 2008

(30) Foreign Application Priority Data
Sep. 24, 2004   (DE) .......................... 10 2004 046 402

(51) Int. Cl.
*G06F 15/16* (2006.01)
*H04M 1/64* (2006.01)
(52) U.S. Cl. .......................................... 709/204; 379/69
(58) Field of Classification Search .......... 709/201–203, 709/217–219, 227–237; 379/67–88.28
See application file for complete search history.

(56) References Cited

U.S. PATENT DOCUMENTS

| | | | | |
|---|---|---|---|---|
| 5,857,013 A | * | 1/1999 | Yue et al. | 379/88.2 |
| 5,894,504 A | * | 4/1999 | Alfred et al. | 379/88.13 |
| 6,314,168 B1 | * | 11/2001 | Larisch | 379/88.22 |

FOREIGN PATENT DOCUMENTS

| | | |
|---|---|---|
| DE | 197 20 597 C2 | 11/1998 |
| DE | 198 54 368 A1 | 5/2000 |
| EP | 0 982 920 A2 | 3/2000 |
| WO | WO 99/23802 A1 | 5/1999 |
| WO | WO 00/51327 | 8/2000 |
| WO | WO 01/47228 A1 | 6/2001 |

OTHER PUBLICATIONS

Siemens AG, "HICOM 300 'Voice Mail Service VMS'", 1995, Order No. A31002-S10-A1-7-5.
Siemens AG, "Hicom 300 Voice Mail Service VMS", Nov. 1995, pp. 1-6, Bestsell-Nr. A31002-S10-A1-7-5.

\* cited by examiner

*Primary Examiner* — Ian N Moore
*Assistant Examiner* — Afshawn Towfighi

(57) ABSTRACT

In one aspect a method based on a system, according to which a first connection is established between a terminal of a mailbox owner and a message storage system and a second connection can be established by the terminal of the mailbox owner to a terminal of the subscriber, if a message has been stored by the subscriber for the mailbox owner. The second connection is established by the set up of a three-way conference connection between the message storage system, the terminal of the mailbox owner and the terminal of the subscriber.

10 Claims, 2 Drawing Sheets

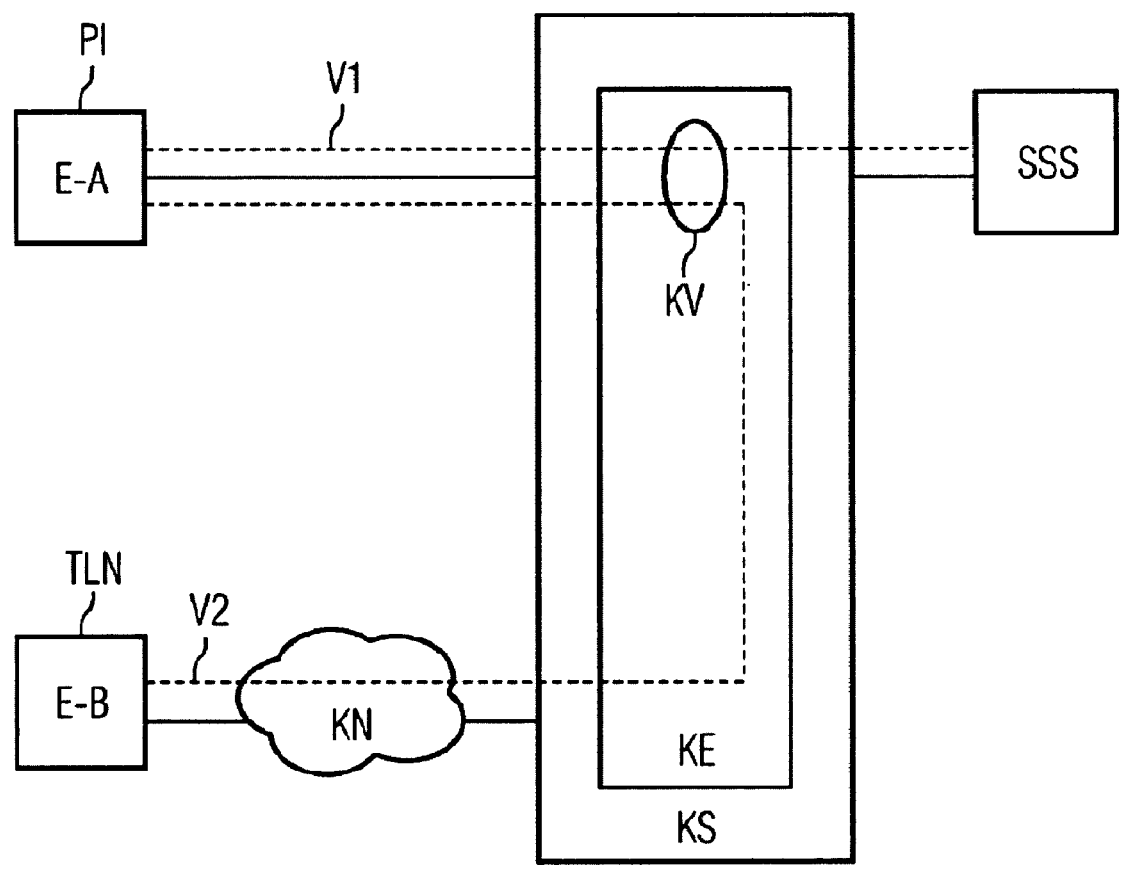

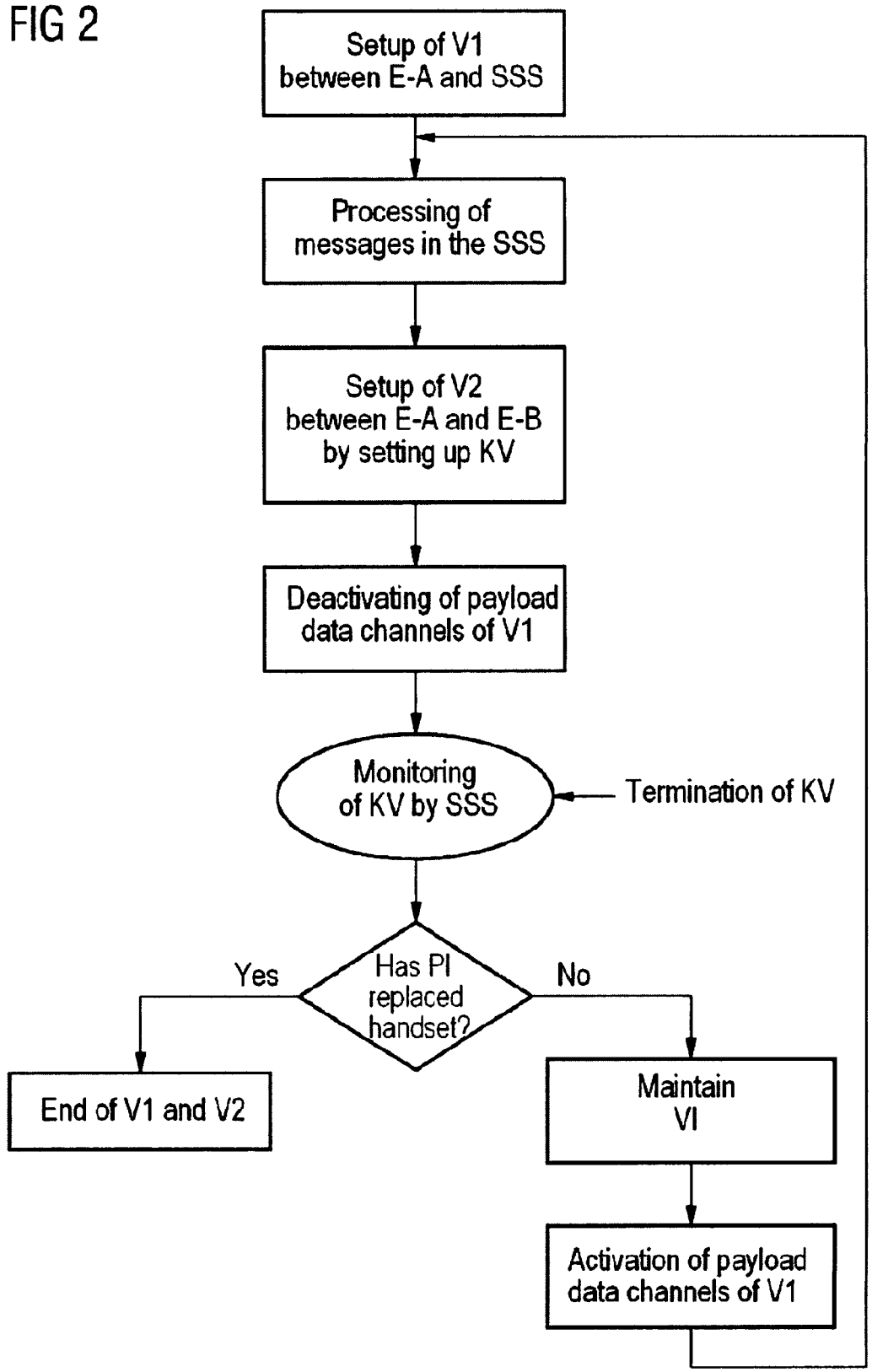

METHOD FOR OUTPUT HANDLING OF MESSAGES STORED IN MAILBOXES OF A MESSAGE STORAGE SYSTEM

This application is the U.S. National Stage of International Application No. PCT/EP2005/054072, filed Aug. 18, 2005 and claims the benefit thereof. The International Application claims the benefits of German application No. 102004046402.2 DE filed Sep. 24, 2004, both of the applications are incorporated by reference herein in their entirety.

FIELD OF INVENTION

The present invention relates to a method for output handling of messages stored in mailboxes of a message storage system, with which method a first connection is set up between a terminal of a mailbox owner and the message storage system and, if a message has been stored for the mailbox owner by a subscriber, a second connection can be set up by the mailbox owner to a terminal of the subscriber.

BACKGROUND OF INVENTION

From the product profile for "HICOM 300 'Voice Mail Service VMS': Siemens AG, 1995, Order No.: A31002-S10-A1-7-5", a 'Voice Mail Service VMS' voice storage system is known which is integrated into a private ISDN switching system. Said voice storage system serves to store, retrieve, and distribute messages in natural-speech form. Users enrolled in the voice storage system have for this purpose been assigned a personal mailbox ("voice mailbox"). When absent, mailbox owners can divert calls intended for them to their mailbox, in which the messages conveyed with the calls are stored.

The enrolled users are able, by dialing their mailbox, to listen to their stored messages at any time and anywhere. Acoustic user prompting makes it easier to work with the voice storage system. Said system is operated with the aid of, for instance, frequency tones that conform to the dual-tone multifrequency (DTMF) signaling system and can be activated via a terminal's keypad.

After being listened to, a stored message can be deleted, stored, or further processed. For example a question asked by a subscriber who has left a voice message can be answered directly in that subscriber's mailbox. When a message has been listened to, a communication connection can also be set up directly to said subscriber without having to enter that person's directory number (callback).

The number of messages requiring to be stored briefly (for example during a meeting) or over the medium term (for example during several days' absence) is growing as a result of the increased use of voice storage systems ('Voice Mail'). It is therefore in the mailbox owner's interest to deal with the totality of stored voice messages as promptly and simply as possible.

In the event of an unsuccessful callback attempt, which is to say a failure to set up a connection between the mailbox owner and a subscriber who has left a voice message, many voice storage systems allow users to leave a voice message and/or then without interruption continue with the processing of a next or, as the case may be, another voice message in terms of a logical 'Voice Mail User Session'. If, conversely, an attempt to establish a connection to a subscriber who has left a voice message is successful, which is to say a desired two-way connection has been set up between the mailbox owner and subscriber with no further involvement of the voice storage system, then on termination of said two-way connection the connection to the voice storage system will also always be terminated.

After a successful connection between the mailbox owner and the subscriber who has left a voice message, in order to resume message processing the mailbox owner must set up another connection to the voice storage system to continue his/her 'Voice Mail User Session' with the next, or, as the case may be, another stored message, or with deleting the message just successfully processed. That means that all the necessary identification data and, where applicable, passwords will also have to be entered again while another connection is being set up.

A method is known from German patent specification DE 197 20 597 C2 that eliminates the need to re-enter the necessary identification data and, where applicable, passwords. For this purpose a second connection is established between a telecommunication system assigned to the mailbox owner and the message storage system before a first connection between the mailbox owner and the message storage system is replaced, with the directory number of the mailbox owner's terminal and that of the message storage system being stored in the telecommunication system. If the connection between the mailbox owner and subscriber is terminated at the subscriber's instigation, a first connection will then be re-established between the mailbox owner and message storage system using the directory numbers stored in the telecommunication system.

That, though, requires an additional interface, for example a CTI interface, between the telecommunication system and message storage system, which is associated with increased technical requirements.

SUMMARY OF INVENTION

An object of the invention is thus to disclose a method and a message storage system by means of both of which the technical requirements for a 'Voice Mail User Session' can be reduced but with the desired convenience being retained.

The inventive method is based on a system wherein a first connection is set up between the mailbox owner's terminal and the message storage system, and wherein, if a message has been stored for the mailbox owner by a subscriber, a second connection can be set up from the mailbox owner's terminal to a terminal of the subscriber.

The second connection is therein inventively set up by establishing a three-way conference connection between the message storage system, the mailbox owner's terminal, and the subscriber's terminal.

A major advantage of the invention is that the inventive method can easily be implemented in already existing systems.

Owing to the first connection's also remaining established throughout the duration of the second connection through the use of a three-way conference connection, with the information about the first connection hence remaining stored in the message storage system during the active second connection, no expansions (additional interface) will be required in a telecommunication system assigned to the mailbox owner or in the message storage system.

Advantageous developments of the invention are indicated in the dependent claims.

According to an embodiment of the present invention the payload data channels, referred to in the relevant literature frequently as "media channels", of the first connection are deactivated during the three-way conference connection. During the second connection, implemented by means of the three-way conference connection, the first connection will hence be muted with respect to the "media channels".

Thanks to deactivating of the first connection's payload data channels, only very little bandwidth will hence be required for the first connection during the three-way conference connection.

According to a further embodiment of the present invention, in cases in which the mailbox owner terminates the three-way conference connection the first connection will likewise be terminated automatically. In cases in which the subscriber terminates the three-way conference connection, the first connection will remain established and the first connection's payload data channels will be reactivated automatically. Processing of the messages stored in the message storage system can in this way be resumed at the place where said processing was interrupted through setting up of the three-way conference connection.

BRIEF DESCRIPTION OF THE DRAWINGS

An exemplary embodiment of the invention is explained in more detail below with the aid of the drawing.

FIG. 1: is a schematic block diagram of the functional units involved in conducting a 'Voice Mail User Session', and FIG. 2: is a flowchart illustrating the main procedural steps performed in a development of the inventive method.

DETAILED DESCRIPTION OF INVENTION

In FIG. 1 is a schematic of a central communication device KS, for example a communication system or communication server, to which a message storage system SSS is connected. A first terminal E-A of a mailbox owner PI and, via a communication network KN, a second terminal E-B are furthermore connected to said central communication device KS. The voice storage system SSS and the first and second terminal E-A, E-B are connected to the central communication device KS via, for example, ISDN or packet-oriented interfaces. The devices can, though, also be connected to each other via any other interfaces.

The second terminal E-B is assigned to a subscriber TLN, with a message (not shown) having been stored in the message storage system SSS for the mailbox owner PI by said subscriber TLN. The messages that can be stored in the message storage system SSS can be, for example, voice messages, fax messages, electronic mail messages, SMS (Short Message Service) messages, MMS (Multimedia Message Service) messages, or audio-visual messages. A first connection V1 has been set up between the first terminal E-A and the message storage system SSS for retrieving the stored message.

When the first connection V1 has been established the mailbox owner PI can begin with processing the messages stored in the message storage system SSS, which is to say can commence the process of outputting these. As part of said outputting process an order can be placed for establishing a connection from the first terminal E-A of the mailbox owner PI to the second terminal E-B of the subscriber TLN (callback). The establishment of a second connection V2 of said type between the first terminal E-A and second terminal E-B is inventively provided via a conference unit KE implemented in the central communication device KS. The conference unit KE can alternatively be provided by means of an autonomous device assigned to the central communication device KS. The establishment of said second connection V2 is therein provided by setting up a three-way conference connection KV between the message storage system SSS, the first terminal E-A, and the second terminal E-B. The three-way conference connection KV therein consists logically of the first connection V1 existing between the first terminal E-A and the message storage system SSS and the second connection V2 existing between the first and second terminal E-A, E-B.

FIG. 2 is a flowchart showing the main steps involved in processing the messages stored in the message storage system SSS, with reference further being made to FIG. 1 for better understanding. For processing the messages stored in the message storage system SSS, in a first step a first connection V1 is established between the first terminal E-A of the mailbox owner PI and the message storage system SSS via the central communication device KS.

The mailbox owner PI can then begin with processing the messages stored in the message storage system SSS, which is to say can commence the process of outputting these. The relevant literature refers in this regard to what is termed a 'Voice Mail User Session'. As part of said outputting process a second connection V2 can be initiated from the first terminal E-A of the mailbox owner PI to the second terminal E-B of the subscriber TLN (callback). The establishment of the second connection V2 is therein provided by setting up a three-way conference connection KV between the message storage system SSS, the first terminal E-A, and the second terminal E-B.

The payload data channels, referred to in the relevant literature frequently as "media channels", of the first connection V1 are deactivated during the three-way conference connection KV. During the second connection V2, implemented by means of the three-way conference connection KV, the first connection V1 will hence be muted with respect to the "media channels". Thanks to deactivating of the payload data channels of the first connection V1, only very little bandwidth will hence be required for the first connection V1 during the three-way conference connection KV.

For the duration of the three-way conference connection KV the message storage system SSS permanently monitors the three-way conference connection KV to detect terminating of the three-way conference connection KV or, as the case may be, second connection V2 by one of the communication partners by, for example, replacing a telephone handset. A distinction is therein made between whether the subscriber TLN or the mailbox owner PI terminates the three-way conference connection KV or, as the case may be, second connection V2.

In cases in which the mailbox owner PI terminates the three-way conference connection KV or, as the case may be, second connection V2, the first connection between the first terminal E-A and message storage system SSS will also be terminated automatically. The 'Voice Mail User Session' will thereupon be fully terminated.

In cases in which the subscriber TLN terminates the three-way conference connection KV or, as the case may be, second connection V2, the first connection V1 will remain established and the payload data channels of the first connection V1 will be automatically reactivated. Processing of the messages stored in the message storage system SSS can in this way be resumed at the place where said processing was interrupted through setting up of the three-way conference connection KV.

Owing to the fact that the first connection V1 also remains established throughout the duration of the second connection V2 through the use of a three-way conference connection KV, with the information about the first connection V1 hence remaining stored in the message storage system SSS during the active second connection V2, no expansions (additional interface) will be required in the central communication device KS or in the message storage system SSS.

The invention claimed is:

1. A method for establishing a connection to a communication device while outputting messages stored in a mailbox of a message storage system, comprising:

setting up a first connection between a terminal of a mailbox owner and the message storage system;

the mailbox owner checking at least one message stored in the message storage system, the at least one message being left by at least one subscriber of a terminal prior to the mailbox owner checking the at least one message;

establishing a three-way conference connection between the message storage system, the terminal of the mailbox owner, and a terminal of a subscriber via the communication device if a message of the at least one message stored in the message storage system has been stored for the mailbox owner by that subscriber and the mailbox owner requested a connection to the terminal of the subscriber;

wherein the establishing of the three-way conference connection occurs while the mailbox owner is checking the at least one message stored in the message storage system;

deactivating a payload data channel of the first connection during the three-way conference connection;

the communication device monitoring the three-way conference connection for a termination of the three-way conference connection by the terminal of the subscriber or by the terminal of the mailbox owner; and terminating the first connection in response to the termination of the three-way conference connection by the terminal of the mailbox owner; and wherein the first connection remains established and the payload data channel of the first connection is reactivated in response to the termination of the three-way conference connection by the terminal of the subscriber.

2. The method of claim 1 wherein the payload data channel is reactivated by the message storage system, or by the terminal of the mailbox owner, or by the communication device, and the communication device being assigned to the terminal of the mailbox owner.

3. The method of claim 1 wherein a processing of the messages stored in the mailbox of the message storage system is resumed at a place where outputting of the messages was interrupted through setting up of the three-way conference connection in response to the payload data channel being reactivated.

4. The method of claim 1, wherein the at least one message stored by the subscriber for the mailbox owner is selected from the group consisting of voice messages, fax messages, electronic mail messages, SMS messages, MMS messages and audio-visual messages.

5. A message storage system, comprising:

a storage system having a mailbox of a first terminal; and a communication device connected to the storage system, the communication device configured to establish a first connection between the first terminal and the mailbox for outputting a message stored in the mailbox, the communication device also configured to establish a three-way conference connection between the first terminal, the mailbox, and a second terminal while the first connection is maintained; and wherein a payload data channel of the first connection is deactivated during the three-way conference connection;

wherein the communication device monitors the three-way conference connection for a termination of the three-way conference connection by the second terminal;

wherein the first connection remains established and the payload data channel of the first connection is reactivated in response to the termination of the three-way conference connection by the second terminal; and wherein the communication device outputting of the message stored in the mailbox of the storage system is resumed via the first connection at a place where the outputting was interrupted through setting up of the three-way conference connection; and wherein the first connection is terminated in response to termination of the three-way conference connection by the first terminal.

6. The message storage system of claim 5 wherein the payload data channel is reactivated by the communication device or by the first terminal, the communication device being a central communication device assigned to the first terminal.

7. The message storage system of claim 5 wherein the outputting of the message stored in the mailbox of the storage system is resumed in response to the payload data channels being reactivated.

8. The message storage system of claim 5 wherein the message stored in the mailbox is selected from the group consisting of voice messages, fax messages, electronic mail messages, SMS messages, MMS messages and audio-visual messages.

9. A communication apparatus of a message storage system comprising:

a communication device, the communication device configured to establish a first connection between a first terminal and a mailbox of a storage system;

a conference call unit connected to the communication device, the conference call unit configured to establish a three-way conference connection between the first terminal, the mailbox of the storage system, and a second terminal while at least one message stored in the mailbox is being outputted to the first terminal; and the communication device being configured to simultaneously maintain the first connection between the first terminal and the mailbox and the three-way conference connection;

wherein the establishing of the three-way conference connection occurs while the mailbox is checked for the at least one message stored in the mailbox of the storage system via the first terminal, the at least one message being left by at least one subscriber of the second terminal prior to the mailbox being checked;

wherein a payload data channel of the first connection is deactivated during the three-way conference connection; and wherein the communication device monitors the three-way conference connection for a termination of the three-way conference connection by the second terminal or the first terminal; and wherein the first connection is terminated in response to the termination of the three-way conference connection by the first terminal; and wherein the first connection remains established and the payload data channel of the first connection is reactivated in response to the termination of the three-way conference connection by the second terminal.

10. The communication device of claim 9 wherein the communication device is a central communication device and the conference call unit is a component of the central communication device.

* * * * *